(12) United States Patent
Tymon et al.

(10) Patent No.: US 10,131,096 B1
(45) Date of Patent: *Nov. 20, 2018

(54) HIGH STRENGTH LEATHER MATERIAL

(71) Applicant: Sustainable Composites, LLC., Lancaster, PA (US)

(72) Inventors: Thomas M. Tymon, Lancaster, PA (US); Zhi Yun Lou-Tymon, Lancaster, PA (US); Hudson T. Van Ormer, Lancaster, PA (US)

(73) Assignee: Sustainable Composites, LLC, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,906

(22) Filed: Jan. 6, 2017

Related U.S. Application Data

(60) Provisional application No. 62/275,485, filed on Jan. 6, 2016.

(51) Int. Cl.
| | |
|---|---|
| *C14B 7/04* | (2006.01) |
| *C08L 89/06* | (2006.01) |
| *C08H 1/06* | (2006.01) |
| *B29K 511/08* | (2006.01) |
| *B29C 70/34* | (2006.01) |
| *B29B 9/02* | (2006.01) |
| *B29B 9/14* | (2006.01) |
| *B29K 105/00* | (2006.01) |
| *B29K 105/16* | (2006.01) |
| *B29L 7/00* | (2006.01) |

(52) U.S. Cl.
CPC .............. *B29C 70/345* (2013.01); *B29B 9/02* (2013.01); *B29B 9/14* (2013.01); *C08H 1/06* (2013.01); *C08L 89/06* (2013.01); *C14B 7/04* (2013.01); *B29K 2105/0064* (2013.01); *B29K 2105/16* (2013.01); *B29K 2511/08* (2013.01); *B29L 2007/00* (2013.01)

(58) Field of Classification Search
None
See application file for complete search history.

(56) References Cited

U.S. PATENT DOCUMENTS

| | | | | |
|---|---|---|---|---|
| 2,040,511 | A * | 5/1936 | Bleyenheuft | D06N 3/0061 162/2 |
| 2,148,904 | A * | 2/1939 | Horowitz | C08L 89/06 106/124.61 |
| 2,148,905 | A * | 2/1939 | Horowitz | C08L 89/06 106/124.61 |
| 2,158,265 | A * | 5/1939 | Wilson | C08L 89/06 162/151 |
| 2,237,235 | A * | 4/1941 | Lynam | C08L 89/06 106/124.6 |
| 2,464,282 | A * | 3/1949 | Abrahams | C08L 89/06 524/21 |
| 2,601,671 | A * | 6/1952 | Wilson | C08J 5/06 162/143 |
| 3,116,200 | A * | 12/1963 | Young | C08L 89/06 162/151 |
| 3,136,682 | A * | 6/1964 | Shu-Tung | C08L 89/06 106/157.5 |

(Continued)

*Primary Examiner* — Mary Lynn F Theisen
(74) *Attorney, Agent, or Firm* — Baker & Hostetler LLP

(57) ABSTRACT

A leather substrate formed from waste leather and its method of production, particularly a leather substrate made up substantially of a collagen fibril matrix.

18 Claims, 3 Drawing Sheets

(56) References Cited

U.S. PATENT DOCUMENTS

| | | | | | |
|---|---|---|---|---|---|
| 3,179,342 | A | * | 4/1965 | Young | D21H 5/1209 241/21 |
| 3,436,303 | A | * | 4/1969 | Fraser | D06N 3/0002 162/123 |
| 3,505,169 | A | * | 4/1970 | Parker | C08L 75/04 106/287.23 |
| 3,542,705 | A | * | 11/1970 | Mason | C08F 236/12 524/11 |
| 3,607,609 | A | * | 9/1971 | Bogdanovicz | D04H 1/00 156/62.2 |
| 4,497,871 | A | * | 2/1985 | Henke | B29B 17/0026 428/473 |
| 4,520,058 | A | * | 5/1985 | Okabe | C08L 89/06 427/206 |
| 4,536,430 | A | * | 8/1985 | Krecke | C08L 89/06 106/124.6 |
| 4,834,762 | A | * | 5/1989 | Nishibori | C08J 3/12 524/10 |
| 5,272,190 | A | * | 12/1993 | Kai | C08L 7/00 524/11 |
| 6,264,879 | B1 | * | 7/2001 | Addie | B29C 70/502 264/115 |
| 9,181,404 | B2 | * | 11/2015 | Neresini | C08L 89/06 |
| 2015/0292148 | A1 | * | 10/2015 | Pourdeyhimi | D06M 17/00 442/402 |

\* cited by examiner

HIGH STRENGTH LEATHER MATERIAL

CLAIM OF PRIORITY

The present application claims priority to and the benefit of U.S. application 62/275,485, "High Strength Leather Material" (filed Jan. 6, 2016), the entirety of which application is incorporated herein by reference for any and all purposes.

FIELD OF THE DISCLOSURE

The disclosure relates to formed leather products and their method of manufacture, particularly, a leather substrate formed in part or in whole from waste leather. Particularly, the disclosure relates to manufacture of a leather substrate material that has a high strength and tear resistance.

Disclosed leather substrate materials have a tear resistance measured by the International Organization for Standardization, for physical and mechanical tests conducted on leather for the determination of tear load (ISO 3377-1) exceeding 25 Newtons(N). Disclosed leather substrate materials likewise have a tear resistance measured by ASTM International for the standard test method for tearing strength, tongue tear of leather (ASTM D 4704 Standard) exceeding 20 Newtons (N).

The formation of such high strength and tear resistant leather materials is very desirable for use in end applications. The disclosed leather substrate materials may have a higher tear resistance than existing or conventional leather products formed from waste leather without the use of non-leather backings, plastic coatings or other non-leather support structures found in conventional leatherette, or artificial leather, materials which may be formed from coated natural or synthetic fibers or leather scraps.

BACKGROUND OF THE DISCLOSURE

Conventional leather is formed by tanning animal hides. The tanning process treats an animal hide with a variety of substances to improve and maintain leather's desirable physical characteristics for use in clothing, upholstery, luggage and like applications. The most desirable physical characteristics of tanned leather include appearance, feel, resilience to stretching, longevity, treatability with a variety of surface conditioning finishes and natural drape.

Leather's desirable characteristics are attributed in part to its being a fibrous, semi-porous material made up of an entangled, open matrix of resistant collagen fibers. Collagen fibers make up majority of leather's composition. Collagen fibers are made up of constituent collagen fibril bundles made up in turn by smaller elongated strands of collagen protein known as collagen fibrils.

Generally, the tanning process is directed toward collagen fibers in order to fix chemically reactive sites on or between or among adjacent collagen molecules. This process links the matrix of resistant collagen fiber bundles, leaving tanned leather pliable, and occupies reactive sites that otherwise would allow leather to degrade and rot. The tanning process likewise removes other compounds from the hide that may be susceptible to degradation and/or perform other functions in the hide that may be replaced with other materials.

Obtaining natural leather is problematic due to supply hide having varying qualities, tanning process costs, varying hide costs over time among other challenges. The leather harvesting, tanning and preparation process produces waste leather byproducts including leather scraps and shavings. If not otherwise used, the waste leather is disposed of in landfills or via incineration creating a negative environmental impact.

Artificial leather products containing waste leather, such as bonded leather, attempt to emulate natural leather. Bonded leather is synthetic leather formed by embedding shredded leather particles into various binding materials including natural or synthetic fibers and plastics. The shredded leather and binding material substance may be applied onto a fabric backing carrier. Bonded leather type synthetic leathers lack the above described desirable characteristics of natural leather. This phenomenon may be attributed to synthetic leathers lacking the continuous matrix of resistant collagen fiber bundles found in natural leather.

The failure of known artificial and synthetic leathers that contain shredded leather particles is that the individual particles do not physically interact to reproduce or emulate the characteristics of a continuous piece of natural leather having an entangled matrix of resistant collagen fibers. Most notably, artificial and synthetic leathers suffer as lacking desirable tensile strength qualities, other strength qualities and esthetic attributes. In tests applied by a conventional tensometer, artificial and synthetic leather samples of 0.010 to 0.080 inch thickness were subjected to pulling stresses under tension to failure. Measurement of maximum applied force before failure was recorded and calculated as maximum tensile strength pound per square inch (PSI) measurements ranging generally from about 790 PSI to about 1750 PSI. Likewise, given the inherently variable makeup of organic animal hides and tanning treatments, the tensile strength qualities of tanned natural leather can vary widely. The tensile strength of representative natural tanned leathers were found to vary from about 2000 PSI to 3200 PSI depending on leather quality, mechanical treatments and coatings applied to the leather.

Processes for forming other types of formed leather substrates containing shredded and fibrillated collagen leather fibers derived from waste derived leather are known. A challenge with these existing processes is the inability to achieve high levels of fibril dispersion so that subsequently formed leather substrates have the potential for fibril to fibril entanglement. Other challenges are that formed interim wet lap products are difficult to dewater and represent a limit to the degree of fibril dispersion which can be achieved in a final leather substrate product. Wet lap may refer to a sheet comprising the dispersion, where particles or fibers are suspended in a fluid and the wet lap may be pressed or otherwise manipulated to eliminate at least a portion of the fluid.

The interim wet lap products of these processes also tend to have low wet lap strengths. This presents processing challenges with manipulating interim wet lap products in large scale production processes using known paper-type processing machines. During transition of the interim wet lap from wire mesh sections of paper-type processing machines, the wet lap tends to break, reducing process efficiency and making it very difficult or impossible to produce the end product on a large scale.

Thus, there is a need for an improved formed leather product that is created from available waste leather byproducts that reproduces desirable physical characteristics of natural leather. The improved leather product should reproduce the collagen fiber matrix that is found in natural leather, have predicable physical characteristics including high tensile strength, desired elastic properties for a range of end applications and treatability by conventional leather conditioning substances. The process of creating the improved leather product should allow improved de-watering of interim wet lap products and have good wet lap strength to facilitate physically manipulating interim wet lap products.

SUMMARY

Figure 1:
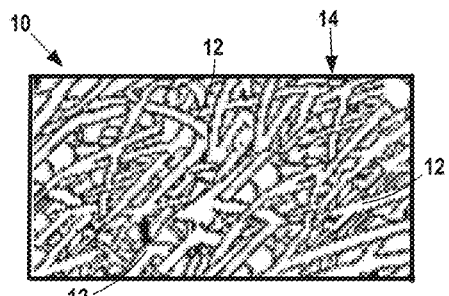
FIG. 1 is a cross-sectional view of prior art conventional tanned leather.

Leather substrates may be formed by processes described generally in the present disclosure. Leather waste may be a source material for the materials used to form the leather substrates described herein. As described herein, leather waste is physically processed by shredding or grinding to create leather pieces, hereinafter, leather particles, of a desired size. The leather particles may be combined with water to form a leather particle/water mixture. The desired size may refer to particle size that provides an apparently even dispersion of leather particles in the leather particle/water mixture. That is, the desired size may provide non-agglomerated pieces or leather particles. For example, the leather waste may be processed in a cutting, grinding, or shredding machine that allows a continuous, thorough shearing or cutting of the leather to provide generally uniform-sized particles. In a specific example, the leather is cut or ground in machinery and screened through apertures of approximately 3/32 of an inch in diameter to provide generally uniform leather particle pieces. However, the leather particles may not necessarily be the same size or same size and shape.

The leather particle/water mixture may be subjected to physical mixing or agitation by mechanical dispersion devices. Potential dispersion devices may include refiners such as double disk refiners or conical refiners as known in paper manufacturing processes. Other potential dispersion devices may include beaters as conventionally known in paper processing machinery, such as Hollander-type beaters.

In some aspects, the pH of water/leather particle mixture may be adjusted. An alkali additive may be added to the water/leather particle mixture to adjust the pH of the mixture to a more basic value, for example, to a pH value between 7.5 and 13. Potential alkali additives may include sodium hydroxide (NaOH), sodium carbonate ($Na_2CO_3$), potassium hydroxide (KOH), calcium hydroxide $Ca(OH)_2$, sodium thiosulfate $Na_2S_2O_3$, among other alkaline compounds, or any combinations thereof.

A polymer latex additive may be added to the water/leather particle mixture. In some examples, certain salts may be added to the water/leather particle mixture either before or after the addition of the polymer latex. Exemplary polymer latex additives may include an acrylic latex polymer such as acrylonitrile latex polymer. Suitable polymer latex additives may further include, but are not limited to, acrylonitrile-butadiene styrene (ABS), styrene-butadiene styrene, acrylonitrile-ethylene-butadiene-styrene, methyl methacrylate-butadiene styrene, polybutadiene, or styrene acrylonitrile latex polymers, among others. In some aspects, the polymer latex additive comprises about 50% polymer. Added salts may include salts of magnesium, strontium and calcium. In particular, added salts may include: magnesium chloride $MgCl_2$ and hydrated forms thereof, calcium chloride $CaCl_2$, magnesium sulfate $Mg_2SO_4$ and hydrated forms thereof, strontium chloride $SrCl_2$, and hydrated forms thereof. Other salts may also be effective, not limited to the above listed divalent cationic salts, including: barium chloride $BaCl_2$, iron(II) chloride $FeCl_2$, magnesium bromide $MgBr_2$, and magnesium iodide $MgI_2$, for example. Ionic salts may be included so as to provide a water/leather particle mixture comprising up to about 25 wt. % of one or more ionic salts. In one example, the water/leather particle mixture comprises about 2% CaCl2 and 2.5% $MgCl_2.6H_2O$ (magnesium chloride hexahydrate).

In additional formation steps, the water/leather particle mixture is formed or extracted into a sheet or other structure, often described as a wet lap for example, that can be physically manipulated, and dewatered. In some aspects, the water/leather particle mixture is extracted into a sheet using wet laid composite processes similar in part to paper making processes as described in the present disclosure. Conventional wet laid processes may refer to non-woven processes where fibers suspended in a fluid are deposited onto a screen or other porous surface to separate the fluid and the resulting web of fibers may be consolidated mechanically, chemically, or thermally.

Disclosed is a formed leather product created from commonly-available waste leather byproducts and its method of manufacture. A process of forming a leather substrate may comprise collecting a portion of leather waste material; shredding and screening the leather waste material to provide leather material particles comprising collagen fiber bundles; combining the leather material particles with a portion of a fluid or water to provide a water/leather material particle or a fluid/leather material particle solution; allowing collagen fiber bundles of the leather material particles to absorb at least a portion of the fluid or water; shearing the leather material particles; dispersing the leather material particles; forming a wet lap or pulp comprising the leather material particles; removing at least a portion of the fluid or water from the fluid/leather material particle solution or from the water/leather material particle solution.

In some aspects, a process of forming a leather substrate may comprise manipulating a leather material to form leather material particles; combining the leather material particles with a fluid to form a leather material solution; adding a polymer latex to the leather material solution; adding an ionic salt to the leather material solution; agitating the leather material solution; and removing at least a portion of the fluid from the leather material solution to form a leather substrate.

A leather substrate formed according to the method disclosed herein wherein the leather substrate exhibits a tear resistance of greater than about 20 Newtons when tested in accordance with ASTM D 4704.

The formed leather product reliably reproduces desirable physical characteristics of natural leather including high tensile strength and desired elastic properties for end applications and treatability by conventional leather conditioning substances.

The improved leather product includes a formed leather substrate containing a matrix formed by collagen fibrils. The collagen fibril matrix is formed from entangled collagen fibrils derived from collagen fibril bundles and collagen fibers found in naturally occurring leather.

The formed leather substrate is formed by physically processing leather waste by shredding or grinding to create leather particles of a desired size as provided herein. The leather particles are combined with water to form a leather particle/water mixture. The mixture is processed to allow collagen fibril bundles within the leather particles to absorb a quantity of water. The water absorption swells and partially distresses the collagen fibril bundles. Distressing of the collagen fibril bundles may refer to the fibril bundles of the leather particles separating or partially separating from one another. For example, ends of individual collagen fibrils may begin to separate from among the collagen fibril bundles. The partially distressed bundles are particularly susceptible to mechanical dispersion. Mechanical dispersion of the swollen, partially distressed fibril bundles extracts a high yield of constituent collagen fibrils from the bundles to the particle/water mixture. Water is then removed from the mixture through a series of dewatering steps to form a leather substrate product containing a matrix of collagen fibrils, bundles and fibers.

The process allows improved de-watering of interim wet lap products. Formed interim wet lap products have improved wet lap strength to facilitate physically manipulating the interim wet lap products. Leather products containing the collagen fibril matrix substrate have improved tensile strength qualities over known artificial and synthetic leathers. In tests by a conventional tensometer, samples of leather substrate products have been subjected to pulling stresses under tension to failure to determine maximum applied force measurements before failure. Measurements recorded and calculated as maximum tensile strength were well above known artificial and synthetic leathers and many natural tanned leather samples.

Leather products containing the collagen fibril matrix substrate share the desirable physical characteristics of conventional leather and may be treated by leather mechanical enhancement techniques such as embossing, calendaring, staking, tumbling and so forth.

The formed leather substrate and its method of manufacture are disclosed herein.

Other objects and features of the leather substrate will become apparent as the description proceeds, especially when taken in conjunction with the accompanying drawing sheets illustrating aspects of the leather substrate.

DETAILED DESCRIPTION

FIG. 1 is a magnified cross-sectional view of conventional tanned leather 10. Leather 10 is made up by numerous elongate, entangled collagen fibers 12 that cooperate to form an open tanned leather matrix 14.

Figure 2:
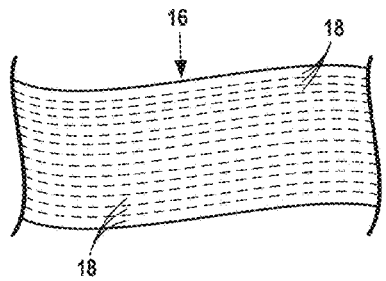
FIG. 2 is a cross-sectional view of a segment of a single collagen fiber bundle.
Figure 3:
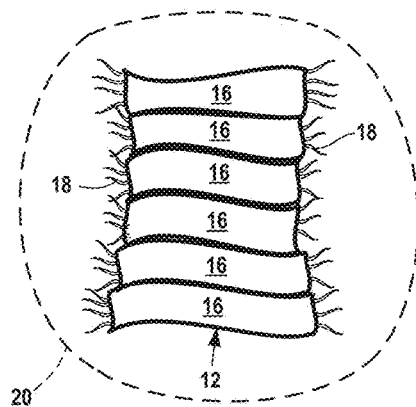
FIG. 3 is a view of a collection of fiber bundle segments found within a leather particle.
Figure 4:
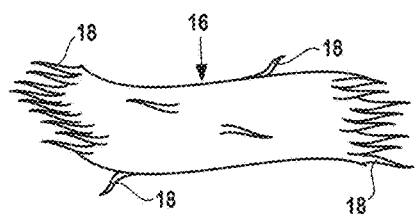
FIG. 4 illustrates a fiber bundle segment.

FIG. 2 is a cross-sectional representational view of a single collagen fibril bundle 16 segment made up of constituent elongated bundles of collagen fibrils 18. It is understood that FIG. 2 is a representational view and that in naturally-occurring collagen fibril bundles, the constituent elongated bundles of collagen fibrils would not be aligned in uniform, parallel formation. The disclosed leather substrate is formed from processing collected scrap leather byproducts derived from conventional leather processing steps.

Figure 5:
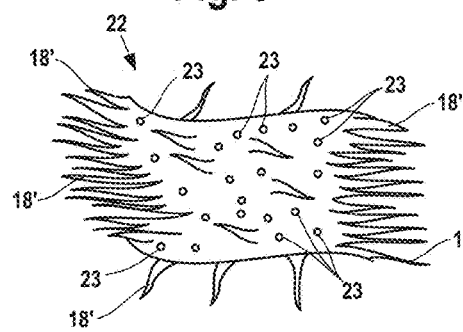
FIG. 5 illustrates a swollen fiber bundle segment.
Figure 6:
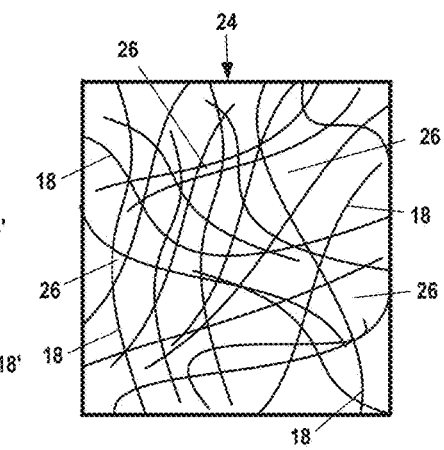
FIG. 6 illustrates a formed collagen fibril matrix.

Collected scrap leather byproducts are ground or shredded into particles 20 of desired size containing leather material including fibril bundles 16. Collagen fibril bundles 16 are subjected to water absorption and distressed though swelling steps described below to form swollen fibril bundles 22. Swollen fibril bundles 22 may include quantities of absorbed water 23 that partially fibrillates the bonds between adjacent collagen fibrils 18. Distressed swollen fiber bundle segments 22 contain fibrillated constituent collagen fibrils 18' as shown in FIG. 5.

The water absorption likewise distresses and partially fibrillates the bonds between adjacent collagen fibers 12 in a particle 20.

Swollen fiber bundle segments 22 are subjected to mechanical dispersion steps to extract elongate constituent collagen fibrils 18. Collagen fibrils 18 are collected and processed to form collagen fibril matrix 24 as detailed below.

The collagen fibril matrix 24 is made up of a number of individual collagen fibrils 18 derived from collagen fiber bundles 12. Each collagen fibril 18 has an elongate body having a cross-sectional diameter generally less than 10 micrometers, and a length generally many times its diameter, each collagen fibril physically engaged and entangled with adjacent collagen fibrils to form collagen fibril matrix 24. Collagen fibril matrix 24 contains a plurality of fine gaps 26 between adjacent collagen fibrils 18 to form an overall open and porous matrix structure.

Methods of forming leather substrates containing collagen fibril matrix 24 are described below.

Figure 7:
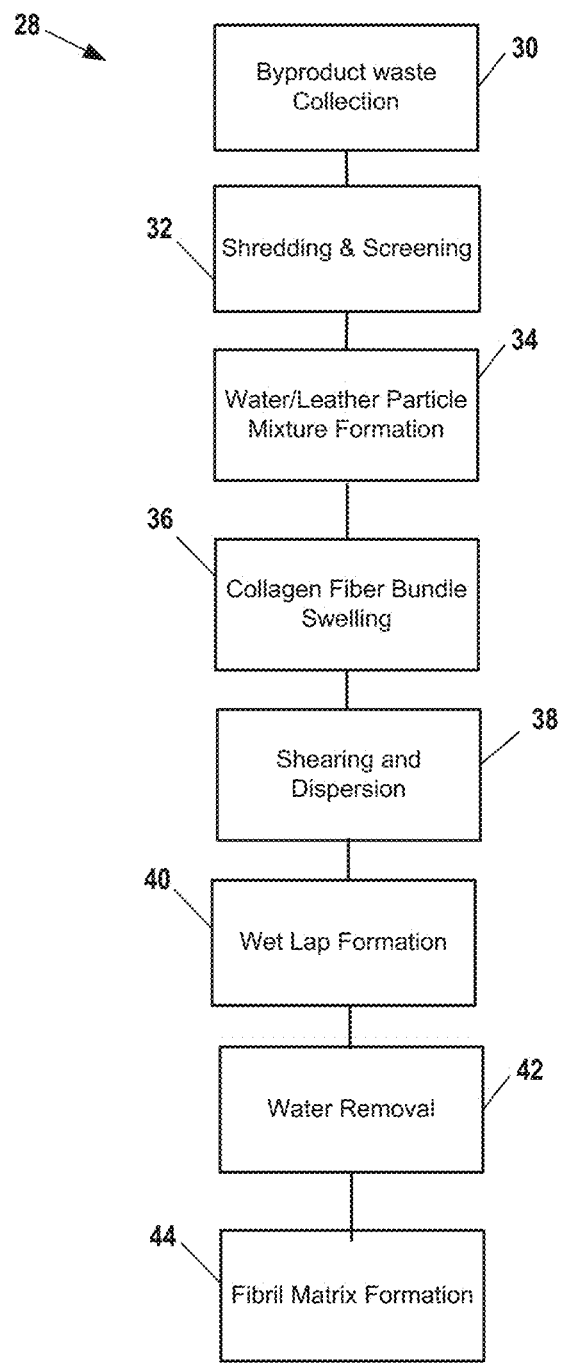
FIG. 7 is a flow chart illustrating example steps in a method of forming a leather substrate according to aspects of the disclosure.

The flowchart of FIG. 7 discloses a method 28 of producing a leather substrate containing the collagen fibril matrix from leather byproduct.

Starting at step 30, leather byproduct waste is collected. Potential byproduct leather waste could be scrap leather waste byproducts produced in tanning processing steps or leather waste from articles manufacture from tanned leather. At step 32, byproduct leather waste is shredded or ground and screened to form de-agglomerated byproduct particles 18 of a desired size. Particles are passed through a screen having screen apertures of a selected size to assure collected particles 18 are of a like selected size. At step 34, collected particles 18 are mixed with a quantity of water to form a particle/water mixture.

Particles 20 become swelled with water from the particle/water mixture. Particle swelling is a result of particle collagen fibril bundles absorbing water from the particle/water mixture to form swollen fibril bundle segments 22 at step 36. The swollen fibril bundle segments are partially distressed, causing partial separation of constituent fibrils which allows improved bundle dispersion in later processing steps.

At step 38, the particle/water mixture is sheared and dispersed by a dispersion device. The dispersion device subjects particles 20 within the particle/water mixture to shear forces that separate collagen fibrils 18 from particle collagen fibril bundles 16. The dispersion process shreds particles 20 and further distresses particle collagen fibril bundles to separate collagen fibrils 18 from particle collagen fibril bundles 12. Potential dispersion devices may be refiners such as a double disk refiner or conical refiner as are known in the paper manufacturing processes. Other potential dispersion devices may be beaters as conventionally known in paper processing machinery, such as Hollander-type beaters. Step 38 dispersion of the particle/water mixture is conducted for a period of time required to obtain desired fibril dispersion. A desired fibril dispersion may refer to a non-agglomerated pieces or leather particles throughout the dispersion. To an observer, the fibril dispersion may appear uniform. With too much mixing, individual leather fibers may begin to agglomerate. The desired fibril dispersion may have no or substantially no agglomerates of leather fiber, that is, there may be a generally even dispersion or distribution of leather fibrils. Substantially no agglomerates may refer to few visible agglomerates.

At step 40, water is removed from the particle/water mixture to form a substrate wet lap. Water is removed from the particle/water mixture to form a wet lap so that the wet lap is sufficiently strong for manipulation. In some examples, the wet lap may include from about 40 weight percent (wt. %) to about 60 wt. % water.

Figure 8:
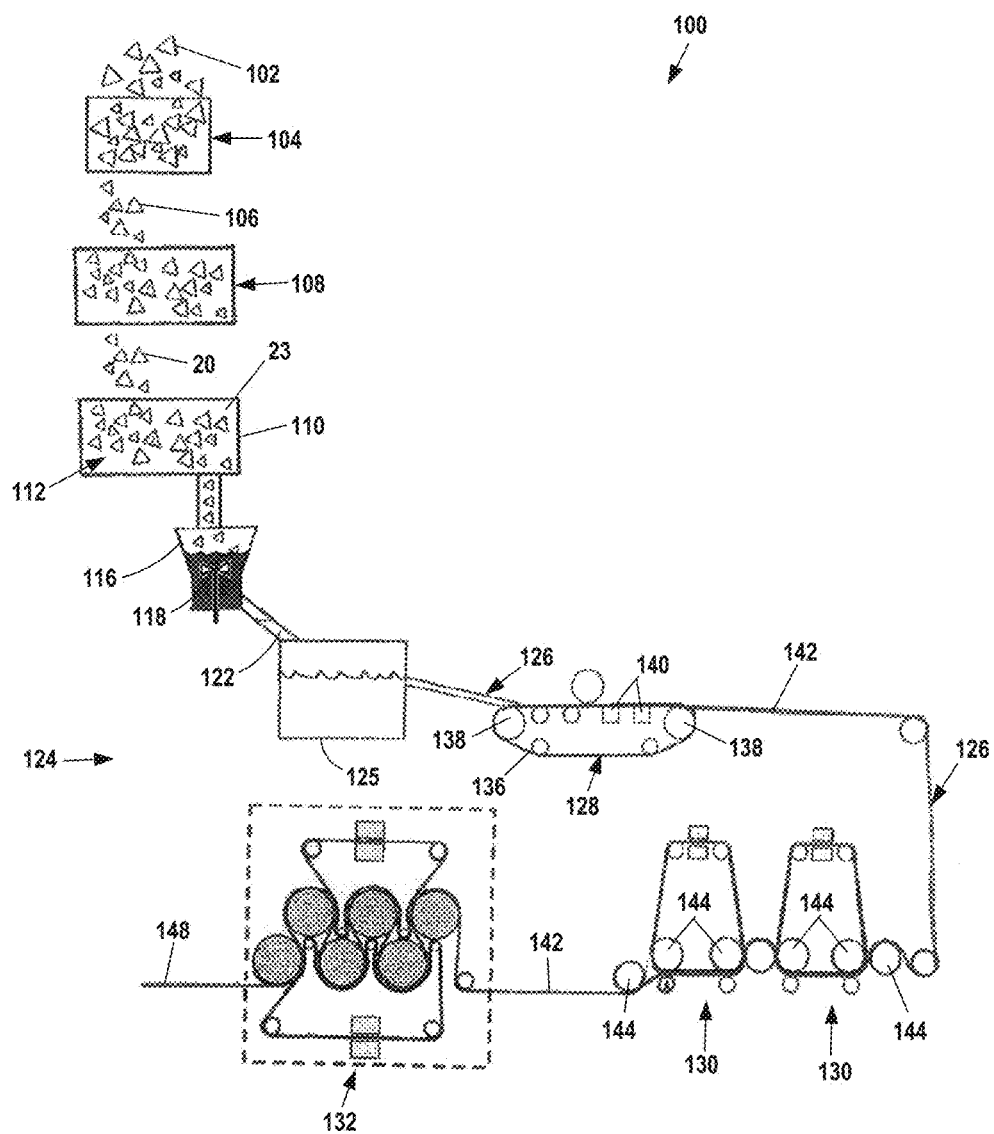
FIG. 8 illustrates an example apparatus for producing a leather substrate material according to an aspect of the disclosure.

Water is further removed from the substrate wet lap to form a leather substrate by steps known in conventional paper manufacturing using machinery as known to convert wet paper pulp to a dried paper product. For instance, draining of the particle/water mixture to form a substrate wet lap may be effected through use of a Fordriner-type machine having various pressing and drying operations as explained in greater detail below. At step 42, water is removed from the substrate wet lap to form a leather substrate containing primarily by-weight of solids and a remainder by-weight of water. As water is removed from the substrate wet lap, separated collagen fibrils 18 within the particle/water mixture physically interact with each other. As adjacent fibrils become physically engaged with each other, leather substrate collagen fibril matrix 24 is formed at step 44. Step 52 water removal may be effected through use of a Fordriner-type machine as explained in greater detail below. FIG. 8 illustrates an apparatus 100 for producing a leather substrate in accordance with the steps shown in the FIG. 7 flowchart. Apparatus 100 may include elements commonly found in Fordriner-type paper processing machines.

In apparatus 100, waste leather 102 is selected and physically processed by shredding or grinding in shredder or grinder 104. Waste leather 102 is selected as described in step 30 of the FIG. 8 flowchart.

Initially collected waste leather 102 may come in the form of scraps from other leather tanning and treatment processes. Shredder or grinder 104 initially de-agglomerates shavings that may have become clumped due to water content or are compacted during bailing or other packaging methods and also grinds larger particles to a desired size. Physical processing by shredding or grinding forms initially shredded leather particles 106. Initially shredded leather particles 106 are screened through screening machine 108 to select leather particles 20 of a desired size and to screen out unwanted waste that may have passed through shredder 104 as described in step 32 above. Alternatively, a grinder may be used having an integrated screen to select processed leather particles having desired size criteria. Leather particles 20 are next mixed with water 23 in a mixing chest or mixing tank 110 to form a water/leather particle mixture 112 containing a percentage of leather particles by-weight as described in step 34 above.

Leather particle collagen fibril bundles absorb water 23 from the particle/water mixture to form swollen fibril bundles 22 at step 38. Water/leather particle mixture 112 is delivered to a dispersion tank 116. Dispersion tank 116 includes a dispersion refiner 118, such as a double disk refiner, a conical refiner or Hollander-type beater as is known in the paper manufacturing art. Dispersion refiner 118 subjects leather particles 20 within mixture 112 to shear dispersion forces as described in step 40 above.

Alternatively, water/leather particle mixture 112 may be separately delivered to a dispersion device and returned to mixing tank 110 for processing before drying steps are undertaken.

Water is separated from mixture 112 to form a wet lap slurry 122. Wet lap slurry 122 is transferred from dispersion tank 116 to processing machine 124 for dewatering as described in step 50 above. Processing machine 124 may be a Fourdrinier-type machine typically used in the making of paper having a head box 125 and a transfer assembly 126 including wire mesh section 128, one or more wet presses 130, dryer cans 132 and calendaring rollers 134.

Initially, wet lap slurry 122 is transferred to proceeding machine head box 125 and to wire mesh section 128 wire mesh endless belt 136. Wire mesh endless belt 136 is made up of a wire meshing to allow initial draining of wet lap slurry 122 and is driven by rollers 138. Vacuums 140 may be used to assist in dewatering wet lap slurry 122. Dewatering by wire mesh section 128 sufficiently dewaters wet lap slurry 122 to form wet lap 142. Wet lap 142 is transferred further along transfer assembly 126 from wire mesh section 128 to one or more wet presses 130 for additional mechanical dewatering by presses 144.

Wet lap 142 is further transferred along assembly 126 from wet presses 130 to drier section 132 for final dewatering by drying. Drier section 132 may include a heated felt dryer known in the paper making art.

At this point in the process, wet lap 142 has been sufficiently dewatered to form a leather substrate 148 having desired moisture content and containing a collagen fibril matrix 24 as described in steps 52 and 54 above.

The present disclosure pertains to and includes at least the following aspects.

Aspect 1. A method of forming a leather substrate material comprising: collecting a portion of leather waste material; shredding and screening the leather waste material to provide leather material particles comprising collagen fiber bundles; combining the leather material particles with a portion of a fluid or water to provide a water/leather material particle or a fluid/leather material particle solution; allowing collagen fiber bundles of the leather material particles to absorb at least a portion of the fluid or water; shearing the leather material particles; dispersing the leather material particles; forming a wet lap or pulp comprising the leather material particles; and removing at least a portion of the fluid or water from the fluid/leather material particle solution or from the water/leather material particle solution.

Aspect 2. A method of forming a leather substrate material comprising: shredding and screening a leather material to provide leather material particles comprising collagen fiber bundles; combining the leather material particles with a portion of a fluid or water to provide a water/leather material particle or a fluid/leather material particle solution; allowing collagen fiber bundles of the leather material particles to absorb at least a portion of the fluid or water; shearing the leather material particles; dispersing the leather material particles; forming a wet lap or pulp comprising the leather material particles; and removing at least a portion of the fluid or water from the fluid/leather material particle solution or from the water/leather material particle solution.

Aspect 2. A method of forming a leather substrate material comprising: manipulating a leather material to form leather material particles; combining the leather material particles with a fluid to form a leather material solution; adding a polymer latex to the leather material solution; adding an ionic salt to the leather material solution; agitating the leather material solution; and removing at least a portion of the fluid from the leather material solution to form a leather substrate wherein the leather substrate exhibits a tear resistance of greater than about 20 Newtons when tested in accordance with ASTM D 4704.

Aspect 3. The method of aspect 2, wherein the leather material comprises waste leather collected from tanning waste.

Aspect 4. The method of aspect 2, wherein agitating the leather material solution comprises physically mixing the leather material solution.

Aspect 5. The method of aspect 2, wherein manipulating the leather material comprises grinding or reducing the leather material to a particulate form.

Aspect 6. The method of aspect 2, further comprising adjusting pH of the leather material solution.

Aspect 7. The method of aspect 2, wherein the ionic salts include magnesium chloride, calcium chloride, magnesium sulfate, strontium chloride, barium chloride, iron(II) chloride, magnesium bromide, and magnesium bromide, or a combination thereof.

Aspect 8. The method of aspect 2, wherein the adding the ionic salt to the leather material solution effects an ionic salt content of up to about 25%.

Aspect 9. The method of aspect 2, wherein the polymer latex comprises an acrylic polymer latex.

Aspect 10. The method of aspect 2, wherein the adding a polymer latex to the leather material solution effects a polymer content of about 25% combined leather material particles and latex polymer solids.

Aspect 11. A leather substrate material formed by a process comprising: manipulating a leather material to form leather material particles; combining the leather material particles with a fluid to form a leather material solution; adding a polymer latex to the leather material solution; adding an ionic salt to the leather material solution; removing at least a portion of the fluid from the leather material solution to form a leather substrate.

Aspect 12. The leather substrate of aspect 11, wherein the leather substrate exhibits a tear resistance of greater than about 20 Newtons when tested in accordance with ASTM D 4704.

Aspect 13. The leather substrate of aspect 11, wherein manipulating the leather material comprises grinding or reducing the leather material to a particulate form.

Aspect 14. The leather substrate of aspect 11, wherein manipulating the leather material comprises shredding the leather material.

Aspect 15. The leather substrate of aspect 11, further comprising adjusting pH of the leather material solution.

Aspect 16. The leather substrate of aspect 11, wherein the ionic salts include magnesium chloride, calcium chloride, magnesium sulfate, strontium chloride, barium chloride, iron(II) chloride, magnesium bromide, and magnesium bromide, or a combination thereof.

Aspect 17. The leather substrate of aspect 11, wherein the adding the ionic salt to the leather material solution effects an ionic salt content of up to about 25%.

Aspect 18. The leather substrate of aspect 11, wherein the polymer latex comprises an acrylic polymer latex.

Aspect 19. The leather substrate of aspect 11, wherein the adding a polymer latex to the leather material solution effects a polymer content of about 25% combined leather material particles and latex polymer solids.

Aspect 20. The leather substrate of aspect 11, wherein the leather substrate exhibits a tear resistance of greater than about 20 Newtons when tested in accordance with ASTM D 4704.

It is also to be understood that the terminology used herein is for the purpose of describing particular aspects only and is not intended to be limiting. As used in the specification and in the claims, the term "comprising" may include the aspects or aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a glass fiber" includes mixtures of two or more such glass fibers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit falling within a range between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required may vary from one aspect or aspect to another, depending on recognized variables such as the materials employed and the processing conditions observed. Thus, it is not always possible to specify an exact "effective amount" or "condition effective to" for each aspect or aspect encompassed by the present disclosure. However, it should be understood that an appropriate effective amount or condition effective to achieve a desired results will be readily determined by one of ordinary skill in the art using only routine experimentation.

As used herein, "fibrils" refers to fine fiberlike materials. Leather materials described herein may comprise fibrils which may associate together in bundles to form larger bundles, often described as leather bundles or leather fibers. The leather bundles or leather fibers or leather fiber bundles may be comprised of a subassembly of fibrils.

As used herein, "polymer latex" may refer to an aqueous colloidal distribution of polymer particles.

Disclosed are the components to be used to prepare disclosed compositions of the invention as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutations cannot be explicitly disclosed, each is specifically contemplated and described herein. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Each of the component starting materials disclosed herein are either commercially available and/or the methods for the production thereof are known to those of skill in the art.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method of forming a leather substrate material comprising:
   processing the leather source material to provide leather material particles, wherein the leather material particles comprise collagen fiber bundles;
   combining the leather material particles with a fluid to form a solution, wherein the leather material particles absorb at least a portion of the fluid;
   adding a polymer latex to the solution;
   causing the collagen fiber bundles to separate into fibrils by dispersing the collagen fiber bundles in the solution;
   removing at least a portion of the fluid from the solution by causing at least a portion of the solution to pass through a mesh medium to provide a wetlap; and
   removing at least a second portion of the fluid from the wetlap by pressing or drying the wetlap to provide the leather substrate material.

2. A method of forming a leather substrate material comprising:
   manipulating a leather material to form leather material particles;
   combining the leather material particles with a fluid to form a solution;
   adding a polymer latex to the solution;
   adding an ionic salt to the solution;
   causing the leather material particles to be dispersed in the solution; and
   removing at least a portion of the fluid from the solution to form a leather substrate wherein the leather substrate exhibits a tear resistance of greater than about 20 Newtons when tested in accordance with ASTM D 4704.

3. The method of claim 2, wherein manipulating the leather material comprises reducing the leather material to a particulate form leather material particles.

4. The method of claim 2, wherein manipulating the leather material comprises reducing the leather material to a particulate form leather material particles and screening the leather material particles to restrict the leather material particles to a desired size.

5. The method of claim 2, wherein the removing at least a portion of the fluid from the solution comprises causing at least a portion of the solution to pass through a mesh medium to provide a wetlap, pressing the wetlap and drying the wetlap.

6. The method of claim 2, further comprising adjusting pH of the solution to a value between 7.5 and 13.

7. The method of claim 2, wherein the ionic salt includes magnesium chloride, calcium chloride, magnesium sulfate, strontium chloride, barium chloride, iron(II) chloride, magnesium bromide, and magnesium bromide, or a combination thereof.

8. The method of claim 2, wherein the adding the ionic salt to the solution effects an ionic salt content of between about 2% and about 6% of the solution.

9. The method of claim 2, wherein the polymer latex comprises an acrylic polymer latex.

10. A leather substrate formed by a process comprising:
    manipulating a leather material to form leather material particles;
    combining the leather material particles with a fluid to form a solution;
    adding a polymer latex to the solution;
    adding an ionic salt to the solution; and
    removing at least a portion of the fluid from the solution to form a leather substrate.

11. The leather substrate of claim 10, wherein the leather substrate exhibits a tear resistance of greater than about 20 Newtons when tested in accordance with ASTM D 4704.

12. The leather substrate of claim 10, wherein manipulating the leather material comprises reducing the leather material to a particulate form.

13. The leather substrate of claim 10, wherein manipulating the leather material comprises shredding or grinding the leather material.

14. The leather substrate of claim 10, wherein the polymer latex comprises about 50% polymer.

15. The leather substrate of claim 10, wherein the ionic salt includes magnesium chloride, calcium chloride, magnesium sulfate, strontium chloride, barium chloride, iron(II) chloride, magnesium bromide, and magnesium bromide, or a combination thereof.

16. The leather substrate of claim 10, wherein the adding the ionic salt to the solution results in the solution having an ionic salt content between about 2% and 6% of the solution.

17. The leather substrate of claim 10, wherein the polymer latex comprises an acrylic polymer latex.

18. The leather substrate of claim 10, wherein the removing at least a portion of the fluid from the solution comprises causing at least a portion of the solution to pass through a mesh medium to provide a wetlap, pressing the wetlap and drying the wetlap.

* * * * *